(12) United States Patent
Asano et al.

(10) Patent No.: US 8,812,774 B2
(45) Date of Patent: Aug. 19, 2014

(54) MEMORY SYSTEM AND COMPUTER PROGRAM PRODUCT

(75) Inventors: Shigehiro Asano, Kanagawa (JP); Shinichi Kanno, Tokyo (JP); Kazuhiro Fukutomi, Kanagawa (JP); Akira Yamaga, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 283 days.

(21) Appl. No.: 13/217,461

(22) Filed: Aug. 25, 2011

(65) Prior Publication Data

US 2012/0246383 A1 Sep. 27, 2012

(30) Foreign Application Priority Data

Mar. 24, 2011 (JP) .................................. 2011-065579

(51) Int. Cl.
*G06F 12/00* (2006.01)
(52) U.S. Cl.
USPC .......................................................... 711/103
(58) Field of Classification Search
CPC ........................................................ G06F 12/00
USPC .......................................................... 711/103
See application file for complete search history.

(56) References Cited

U.S. PATENT DOCUMENTS

| 2004/0177216 | A1 | 9/2004 | Asari et al. | |
| 2005/0144516 | A1* | 6/2005 | Gonzalez et al. | 714/8 |
| 2010/0082887 | A1 | 4/2010 | Mitsunaga et al. | |
| 2011/0202812 | A1 | 8/2011 | Asano et al. | |

FOREIGN PATENT DOCUMENTS

| JP | 2004-265162 A | 9/2004 |
| JP | 2006/99594 A | 4/2006 |
| JP | 2006-338091 | 12/2006 |
| JP | 2007-520842 A | 7/2007 |
| JP | 2007-334413 | 12/2007 |
| JP | 2010-86106 A | 4/2010 |

OTHER PUBLICATIONS

Office Action issued Jan. 29, 2013 in Japanese Application No. 2011-065579 (With English Translation).
Office Action issued Nov. 13, 2012 in Japanese Patent Application No. 2011-065579 (with English-language translation).
U.S. Appl. No. 13/218,812, filed Aug. 26, 2011, Fukutomi, et al.
U.S. Appl. No. 13/037,970, filed Mar. 1, 2011, Shigehiro Asano, et al.
Hyojun Kim, et al., "BPLRU: A Buffer Management Scheme for Improving Random Writes in Flash Storage", Software Laboratory of Samsung Electronics, Korea, Aug. 24, 2011, 13 Pages.
David A. Patterson, et al. "A Case for Redundant Arrays of Inexpensive Disks (RAID)", Computer Science Division, Department of Electrical Engineering and Computer Sciences, 1988, 8 Pages.

\* cited by examiner

*Primary Examiner* — Aimee Li
*Assistant Examiner* — Christopher Do
(74) *Attorney, Agent, or Firm* — Oblon, Spivak, McClelland, Maier & Neustadt, L.L.P.

(57) ABSTRACT

According to an embodiment, a memory system includes semiconductor memories each having a plurality of blocks; a first table; a receiving unit; a generating unit; a second table; and a writing unit. The first table includes a plurality of memory areas each associated with each block and in each of which defect information is stored. The generating unit generates a set of blocks by selecting one block to which data are to be written in each semiconductor memory based on an index number indicating one of a plurality of rows in the first table and the first table. In the second table, an index number and a channel number are stored for each logical block address in association with one another. When a write command is received by the receiving unit, the writing unit writes data to a block associated with a selected channel number among blocks constituting the set.

20 Claims, 12 Drawing Sheets

LOGICAL BLOCK ADDRESS: 29 BITS

UPPER 26 BITS REPRESENT INDEX
FOR EACH OF 48M ENTRIES IN
SECOND TABLE

LOWER 3 BITS
REPRESENT
LOCATION OF SECTOR
IN PAGE (4 KB)

| DATA | LOGICAL BLOCK ADDRESS | PAGE ECC |

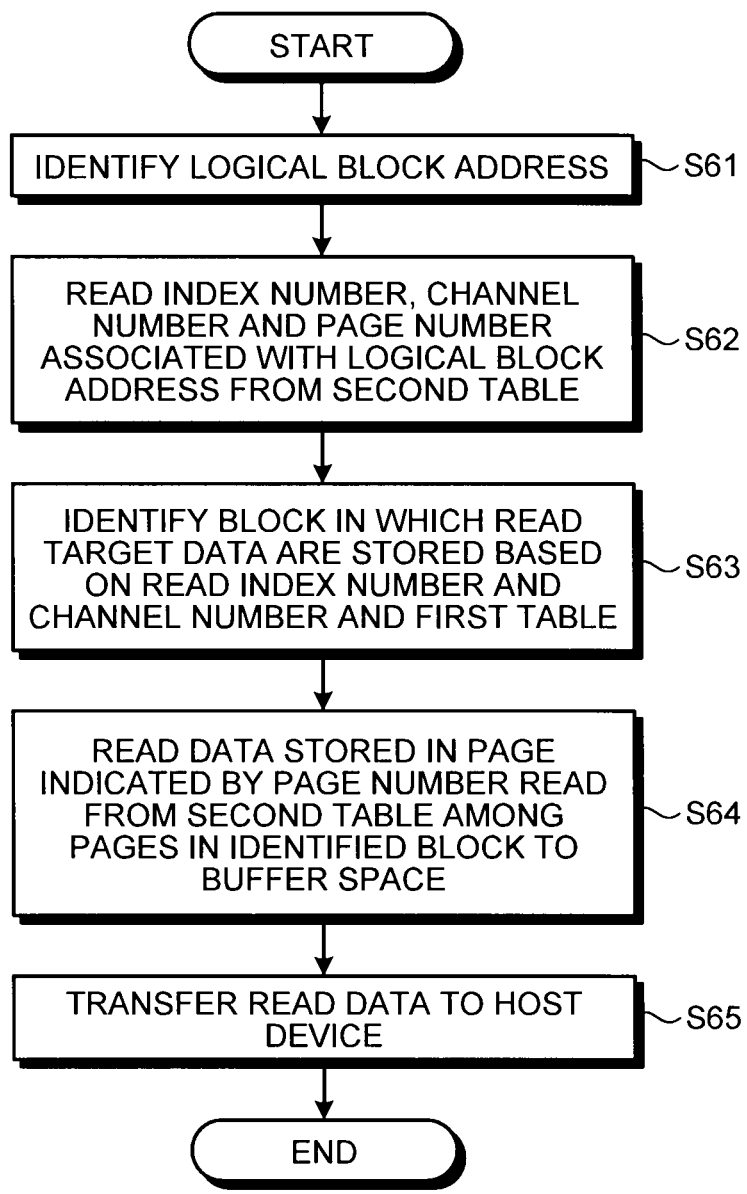

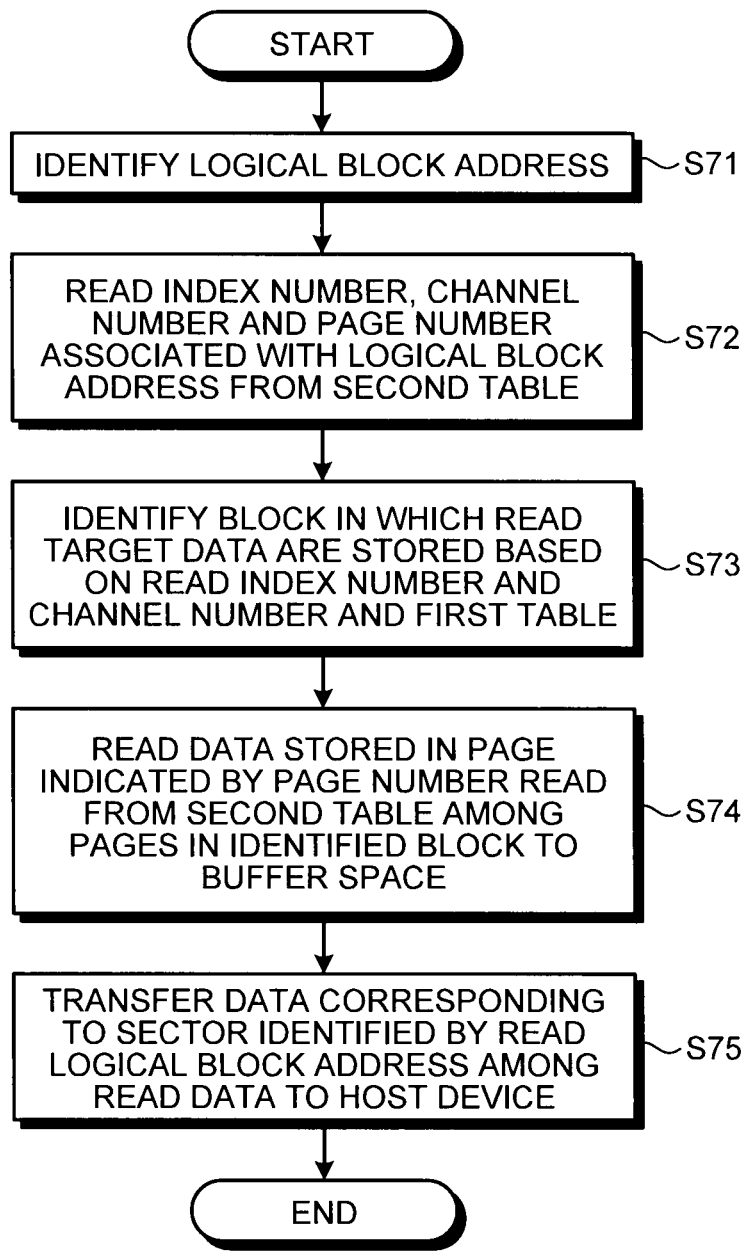

MEMORY SYSTEM AND COMPUTER PROGRAM PRODUCT

CROSS-REFERENCE TO RELATED APPLICATIONS

This application is based upon and claims the benefit of priority from Japanese Patent Application No. 2011-065579, filed on Mar. 24, 2011; the entire contents of which are incorporated herein by reference.

FIELD

An embodiment described herein relates generally to a memory system and a computer program product.

BACKGROUND

Conventionally, NAND-type flash memories (referred to as NAND flash memories) have been widely used as nonvolatile semiconductor memory chips. In a NAND-type flash memory, a smallest unit for recording is a page, and writing is performed in units of pages. For reading out data that have been written in response to a request from a host, it is necessary to identify, from a logical block address specified by the host, a storage location (physical block address) in which the data associated with the logical block address are actually stored in a NAND flash memory. In a memory system with semiconductor memory chips, a plurality of semiconductor memory chips each having a plurality of blocks (unit storage areas) is used so as to achieve a large capacity. In addition, a technique of using a set of blocks each included in a semiconductor memory chip to perform error correction is known.

If a plurality of blocks constitutes a set for error correction, a table (logical-to-physical translation table) that is referred to so as to see which blocks constitute a set is necessary to perform correction. There is, in this regard, a demand for reducing the size of the logical-to-physical translation table in terms of cost reduction. An object to be achieved by the embodiment is to provide a memory system in which a logical-to-physical translation table having information on sets of blocks therein can have a reduced size in performing error correction using such sets of blocks.

BRIEF DESCRIPTION OF THE DRAWINGS

FIG. 12 is a flowchart illustrating an example of a page size read process; and

FIG. 13 is a flowchart illustrating an example of an under-page-size read process.

DETAILED DESCRIPTION

According an embodiment, a memory system includes a plurality of semiconductor memories each having a plurality of blocks; a first table in which a plurality of memory areas that is associated one-to-one with the blocks in the semiconductor memories is arranged in a matrix, the memory areas associated with the respective blocks in any one of the semiconductor memories are arranged in each column, and defect information indicating presence or absence of a defect in a block associated with each memory area is stored in the memory area; a receiving unit configured to receive a write command requesting writing of data; a generating unit configured to select one of a plurality of index numbers associated one-to-one with a plurality of rows in the first table, and select one block to which data are to be written in each of the semiconductor memories based on the selected index number and the first table to generate a set of the blocks; a second table in which the index number and one of a plurality of channel numbers associated one-to-one with the semiconductor memories are stored in association with each of logical block addresses individually given to a plurality of pieces of the data; and a writing unit configured, when the write command is received by the receiving unit, to select one of the channel numbers, write the data requested to be written to a block associated with the selected channel number among the blocks constituting the set, and write the logical block address given to the data, the index number associated with the set and the selected channel number in association with one another into the second table. When the blocks in each of the semiconductor memories have no defect, the generating unit selects one block associated with the memory area belonging to a row indicated by the index number from each of the semiconductor memories.

Various embodiments will be described hereinafter with reference to the accompanying drawings.

Figure 1:
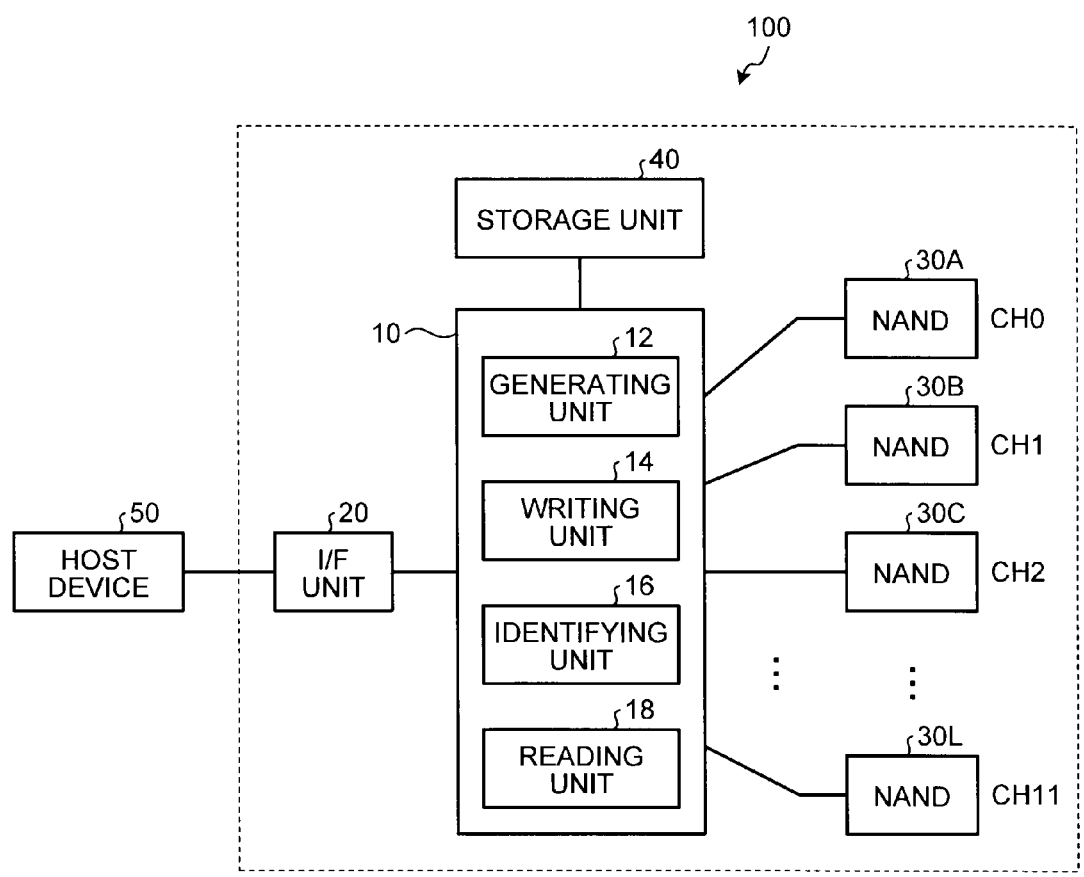
FIG. 1 is a block diagram of a memory system according to an embodiment.

FIG. 1 is a block diagram illustrating an example of a schematic configuration of a memory system 100 according to an embodiment. As illustrated in FIG. 1, the memory system 100 includes a control unit 10, an interface (I/F) unit 20, a plurality of (twelve) semiconductor memories 30A to 30L, and a storage unit 40.

The control unit 10 is means for controlling respective components of the memory system 100, and may be a central processing unit (CPU), for example. The I/F unit 20 controls communication with a host device 50, which is a host device of the memory system 100, under the control of the control unit 10. The I/F unit 20 may be a SAS/SATA interface, for example. The host device 50 sends signals such as a write command requesting writing of data and a read command requesting reading of data to the memory system 100.

The semiconductor memories 30A to 30L are memory elements made of semiconductor chips, and constituted by NAND-type flash memories, for example. In the following description, the semiconductor memories 30A to 30L will be simply referred to as semiconductor memories 30 when it is not necessary to distinguish individual semiconductor memories 30A to 30L. Data can be read and written from/to the semiconductor memories 30 in units called pages. A plurality of pages constitutes a memory area in units called blocks.

Herein, one page equals 4 KB, and 64 pages constitute one block. One semiconductor memory 30 is constituted by a plurality of blocks.

As illustrated in FIG. 1, one channel (CH0 to CH11) is assigned to each of the semiconductor memories 30A to 30L. One channel (CH11 in this example) of the channels (CH0 to CH11) is set as a channel to which redundant information is written, and the other channels (CH0 to CH10) are set as channels to which data requested to be written by the host device 50 are written. An error correcting code is generated from a set of pages in the respective channels CH0 to CH11. As will be described below, the control unit 10 divides data requested to be written by the host device 50 if the data is larger than a page size, assigns the divided data pieces in units of pages (divided data pieces) to the respective channels CH0 to CH10 and performs writing.

Here, a write method for writing to the semiconductor memories 30 will be described. A write once system is employed in a NAND-type flash memory. In the write once system, data are erased in units of blocks and written in units of pages to an erased block. Accordingly, in the NAND-type semiconductor memories, data can be written to unwritten pages in an erased block, and written pages cannot be overwritten.

A logical block address (LBA) is given to data to be written in response to a request from the host device 50, and a write command transmitted from the host device 50 contains data requested to be written and a logical block address given to the data. In the embodiment, a block to which data from host device 50 should be written is determined based on a logical-to-physical translation table, which will be described later, regardless of the logical block address given to the data, and the data are written in the ascending order of pages in the semiconductor memories 30. When writing of new data is requested by the host, the control unit 10 performs writing of the new data to an unwritten page in an erased block. In this case, the page to which data are previously written is set to be invalid and the page to which the new data are written is set to be valid. In this case, the control unit 10 performs writing of new data and redundant information while generating the aforementioned error correcting code.

In the log structured system described above, as the number of invalid pages increases as a result of writing, the capacity of the semiconductor memories 30 at which writing can be realized (referred to as writable capacity) decreases. At a point when new erased blocks to which data can be written, namely, free blocks in which data are not yet written after erasure thereof are decreased and a set of blocks (logical blocks) constituting an error correcting code cannot be reserved any longer, writing becomes impossible. To avoid this, the control unit 10 performs garbage collection at appropriate timings. The garbage collection performed in this embodiment is particularly referred to as compaction.

Figure 2:
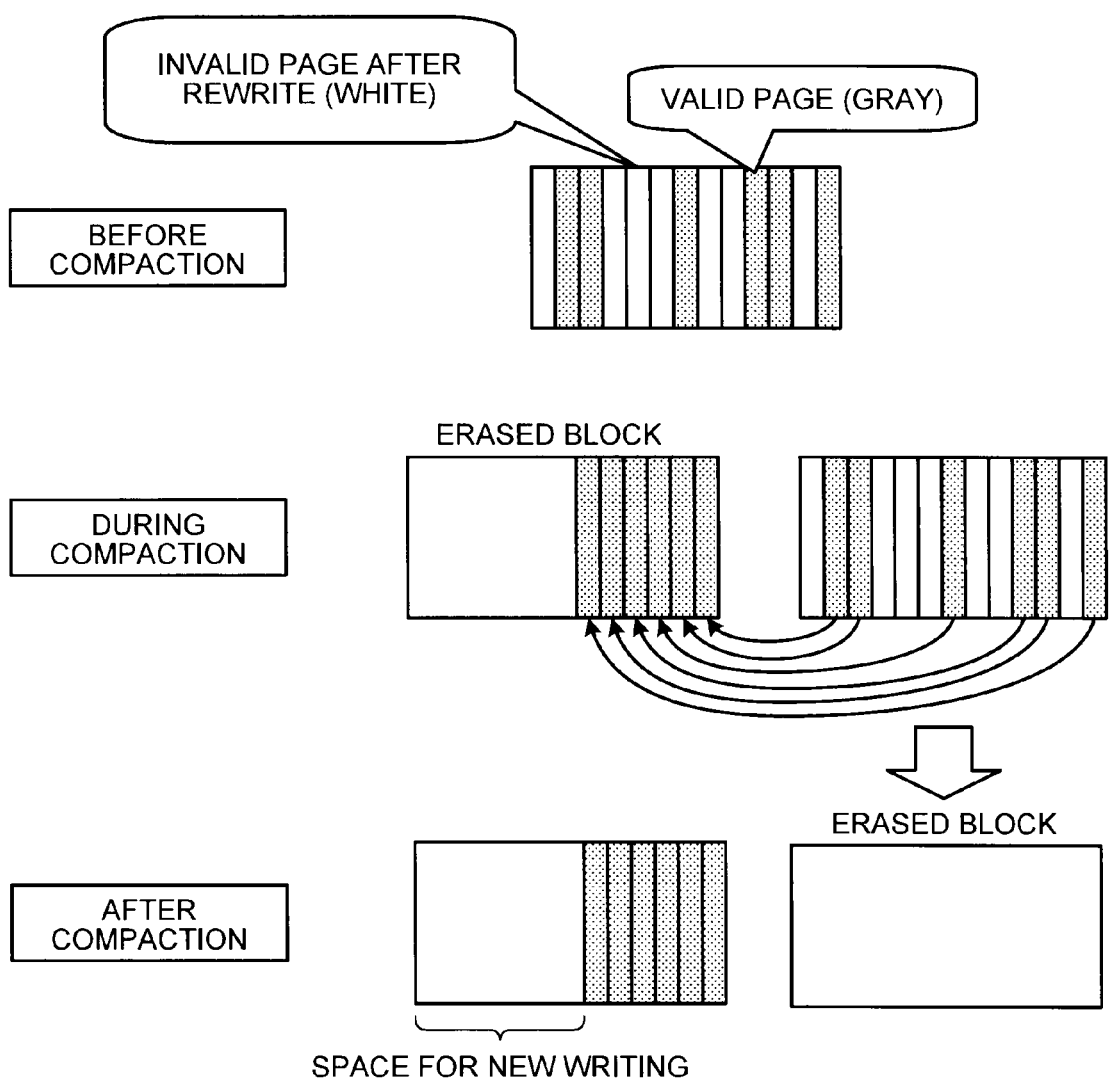
FIG. 2 is a conceptual diagram for describing compaction.

FIG. 2 is a conceptual diagram for describing compaction. The control unit 10 collects data (referred to as valid data) written in pages that have not become invalid in blocks including invalid pages and newly rewrites the collected valid data in free blocks to move the valid data thereto. The control unit 10 then erases the block to generate a new free block. The control unit 10 allows blocks that were unwritable to become writable again by performing such compaction, allowing free blocks to be reserved. If there is an unwritten page in a block in which valid data are written as a result of moving data, data can be newly written to the page.

At least one free block is needed to perform such compaction, which means that the capacity (referred to as implemented capacity) implemented in the semiconductor memories 30 is smaller than the capacity (writable capacity) at which writing can be actually realized. Herein, the difference between the implemented capacity and the writable capacity is referred to as spare capacity. When the spare capacity is small, the control unit 10 has to frequently carry out compaction, which has a great impact on performance thereof.

Figure 3:
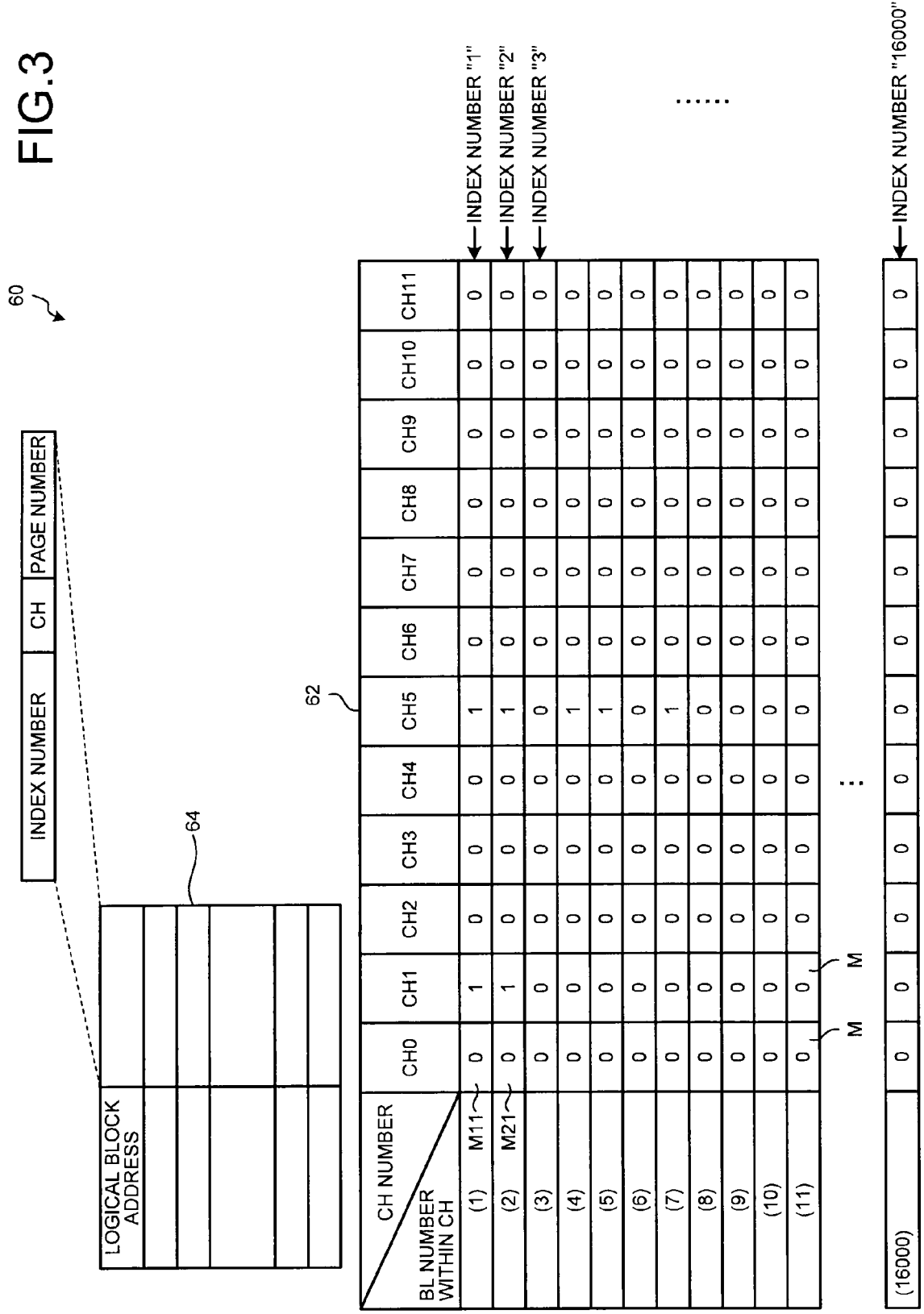
FIG. 3 illustrates an example of a logical-to-physical translation table.

The description is continued referring back to FIG. 1. The storage unit 40 stores various data and various programs. In the embodiment, the storage unit 40 stores the logical-to-physical translation table. FIG. 3 illustrates an example of a logical-to-physical translation table 60. As illustrated in FIG. 3, the logical-to-physical translation table 60 includes a first table 62 and a second table 64. In the first table 62, memory areas M, which are associated one-to-one with a plurality of blocks in each of the semiconductor memories 30A to 30L (CH0 to CH11), are arranged in a matrix and memory areas M each associated with a block in any one of the semiconductor memories 30 are arranged sequentially in each column. In the first table 62 in the example of FIG. 3, a first column corresponds to the semiconductor memory 30A (channel CH0), a second column corresponds to the semiconductor memory 30B (channel CH1), a third column corresponds to the semiconductor memory 30C (channel CH2), a fourth column corresponds to the semiconductor memory 30D (channel CH3), a fifth column corresponds to the semiconductor memory 30E (channel CH4), and a sixth column corresponds to the semiconductor memory 30F (channel CH5). Furthermore, a seventh column corresponds to the semiconductor memory 30G (channel CH6), an eighth column corresponds to the semiconductor memory 30H (channel CH7), a ninth column corresponds to the semiconductor memory 30I (channel CH8), a tenth column corresponds to the semiconductor memory 30J (channel CH9), an eleventh column corresponds to the semiconductor memory 30K (channel CH10), and a twelfth column corresponds to the semiconductor memory 30L (channel CH11).

By way of example, the total capacity of the semiconductor memories 30 is 192 GB herein. Since the capacity of 192 GB is realized by twelve channels, the total number of blocks is 192,000 assuming that a block has a size of 1 MB. Then, the number of blocks of each channel is 192,000-12=16,000. That is, the memory areas M are arranged in a matrix of 16,000 lines×12 columns. For convenience of description, a memory area M in the i-th row ($1 \le i \le 16{,}000$) and the j-th column ($1 \le j \le 12$) in the first table 62 will be hereinafter referred to as Mij. When it is not necessary to distinguish individual memory areas, the memory areas will be simply referred to as memory areas M.

In the embodiment, the j-th column in the first table 62 corresponds to a channel CHj−1. For example, the first column in the first table corresponds to the channel CH0, and the second column therein corresponds to the channel CH1. Focusing on the first column in the first table 62, a memory area M11 in the i-th row corresponds to a block in the i-th row (i-th block) of the channel CH0, in which 16,000 blocks are arranged sequentially along the column direction. For example, a memory area M11 corresponds to a block in the first row of the channel CH0, and a memory area M21 corresponds to a block in the second row of the channel CH0. Memory areas in other columns correspond to respective blocks in the same manner.

In the embodiment, each memory area M has stored therein defect information indicating presence or absence of a defect in a block associated with the memory area M. In the embodiment, the defect information is expressed by 1-bit information. If a block has a defect, defect information stored in a memory area M associated with the block is set to "1". If a block has no defect, on the other hand, defect information stored in a memory area M associated with the block is set to "0". Alternatively, defect information stored in a memory area M associated with a block may be set to "0" if the block has a defect while defect information stored in a memory area M associated with a block may be set to "1" if the block has no defect.

In addition, an index number is assigned individually to each row in the first table 62. In the embodiment, an index number "i" is assigned to the i-th row in the first table 62. For example, the index numbers are assigned in the first table 62 in a manner that an index number "1" is assigned to the first row and an index number "2" is assigned to the second row. The method for assigning the index numbers may be any method, and an index number "3" may alternatively be assigned to the first row in the first table 62, for example. In other words, the method for assigning the index numbers may be any method that can assign an index number for identifying a row individually to each row in the first table 62.

On the other hand, as illustrated in FIG. 3, the second table 64 has stored therein the aforementioned index number, a channel number indicating a number of a channel and a page number indicating a number of a page in association with one another for each logical block address. Herein, the respective entries (areas in which data are stored) in the second table 64 store the aforementioned index numbers, channel numbers and page numbers with the logical block addresses as indices. In the embodiment, since the capacity of 192 GB is managed in units of 4 KB (size per page), the number of entries in the second table 64 is 48M, which is expressed in 26 bits. In addition, one page is divided into sectors of 512 bytes, and each sector is expressed in 3 bits.

Figure 4:
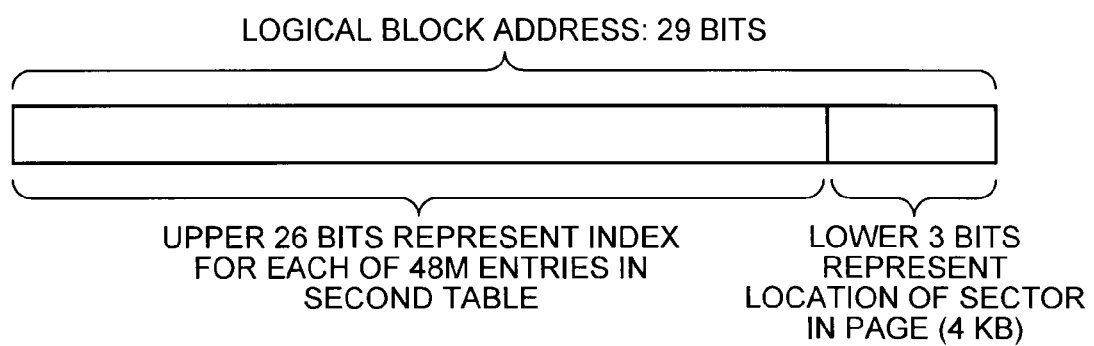
FIG. 4 illustrates an example of a logical block address structure.

In the embodiment, a logical block address is 29-bit long in which the upper 26 bits represent an index for each entry in the second table 64 and the lower 3 bits represent a location of a sector in a page as illustrated in FIG. 4.

The description is continued referring back to FIG. 1. The control unit 10 implements functions of a generating unit 12, a writing unit 14, an identifying unit 16 and a reading unit 18 by executing control programs stored in the storage unit 40. For writing data, it is necessary to select a block and a page within the block to which the data are to be written. Selection of a block to which data are to be written will be described here. The generating unit 12 generates a set of blocks (logical block) by selecting one free block from each of the channels CH0 to CH11 before writing is started. In the embodiment, the generating unit 12 generates the set of blocks (logical block) by selecting an index number associated with a logical block composed of free blocks only, namely, a free logical block, and selecting one block to which data are to be written in each of the channels CH (in each of the semiconductor memories 30) based on the selected index number and the first table 62. The index number can also be regarded herein as a number (logical block number) for identifying a logical block. In selecting the index number (logical block number), a free logical block that is least frequently selected is selected first so as to equalize the numbers of rewrites in respective blocks.

An initial state in which writing of data to the semiconductor memories 30 has not been performed is assumed here. In this state, the generating unit 12 can select any one index number from the index numbers 1 to 16,000. In the example of FIG. 3, a case in which the generating unit 12 selects an index number "5" is assumed. If no defect is present in the blocks and all of the defect information stored in the memory areas M are "0", the generating unit 12 selects one block associated with a memory area M belonging to a row associated with the index number "5" in the first table 62 in each of the channels, and generates a logical block from the selected blocks. Since the row associated with the index number "5" in the first table 62 is the fifth row herein, the generating unit 12 selects a block (fifth block) belonging to the fifth row of each of the channels (CH0 to CH11), and generates the logical block therefrom.

However, since a memory area M with defect information "1" is also present (a defective block is also present) in practice as illustrated in FIG. 3, the generating unit 12 generates a logical block based on the selected index number and the defect information in the first table 62. More specifically, the generating unit 12 selects a fifth nondefective block counted from the top row, the "fifth" corresponding to the selected index number "5", in each column in the first table 62 and generates the logical block therefrom. Herein, the generating unit 12 selects a block associated with a fifth memory area M counted from the top out of memory areas M with the defect information "0" stored therein in each column in the first table 62.

For example, focusing on the first column in the first table 62, the generating unit 12 selects a block (fifth block in CH0) associated with the fifth memory area M51 counted from the memory area M11 belonging to the first row out of the memory areas with the defect information "0" in the first column. For another example, focusing on the second column in the first table 62, the generating unit 12 selects a block (seventh block in CH1) associated with the fifth memory area M72 counted from the memory area M31 belonging to the third row because the defect information stored in each of the memory areas M (M12, M22) in the first and second rows is "1". Blocks in other columns are selected in the same manner. Specifically, in the example of FIG. 3, when the selected index number is "5", the generating unit 12 selects the fifth block in each of CH0, CH2 to CH4 and CH6 to CH11, the seventh block in CH1 and the tenth block in CH5, and generates a logical block therefrom.

The description is continued referring back to FIG. 1. When a write command is received by the I/F unit 20 from the host device 50, the writing unit 14 determines a block to which data (referred to as "write target data") requested to be written are written out of a plurality of (twelve) blocks constituting a logical block generated in advance by the generating unit 12, and writes the data to the determined block.

In the embodiment, the writing unit 14 performs writing in a round-robin fashion in units of 4 KB (corresponding to a page size) in the channels other than a channel (CH11 herein) to which redundant information is to be written, and determines the channel to which writing is to be performed according to the order of round robin. In the writing, the writing unit 14 sets a writing pointer to an unwritten page in the determined block, and writes the write target data to the page at the location pointed by the writing pointer. The writing unit 14 then updates the writing pointer to point the location of a next unwritten page following the page to which the data have been written. Therefore, the value of the writing pointer changes to sequentially point the next writing position.

Here, a data structure of the write target data and the redundant information will be described. The writing unit 14 adds, to the write target data, an error correcting code (referred to as a page ECC) for detecting and correcting an error of the write target data itself and a logical block address given to the write target data. The page ECC includes codes such as a CRC code for detecting a data error, and an ECC code for correcting the data error. The reason why the page ECC also includes a CRC code is that there is a possibility of miss correction when the data error cannot be corrected with the ECC code.

Figure 5:
FIG. 5 illustrates an example of write target data.

FIG. 5 is a diagram illustrating the write target data to which the redundant information is added. The writing unit 14 writes the write target data to which the page ECC and the logical block address are added to the page in the block determined as described above pointed by the recoding pointer. The write target data has a size in units of pages, and the page size in a block equals the size of the entire data including the write target data and the page ECC and logical block address added thereto. When the write target data are larger than the page size, the writing unit 14 divides the write target data into a plurality of divided data pieces, and calculates logical block addresses of the divided data pieces based on the logical block address given to the write target data. Meanwhile, the writing unit 14 adds, to the redundant information, a page ECC for detecting and correcting an error in the redundant information itself calculated to be an error correcting code. The writing unit 14 then writes the redundant information to the page pointed by the writing pointer of the CH11. That page includes a page ECC.

Figure 6:
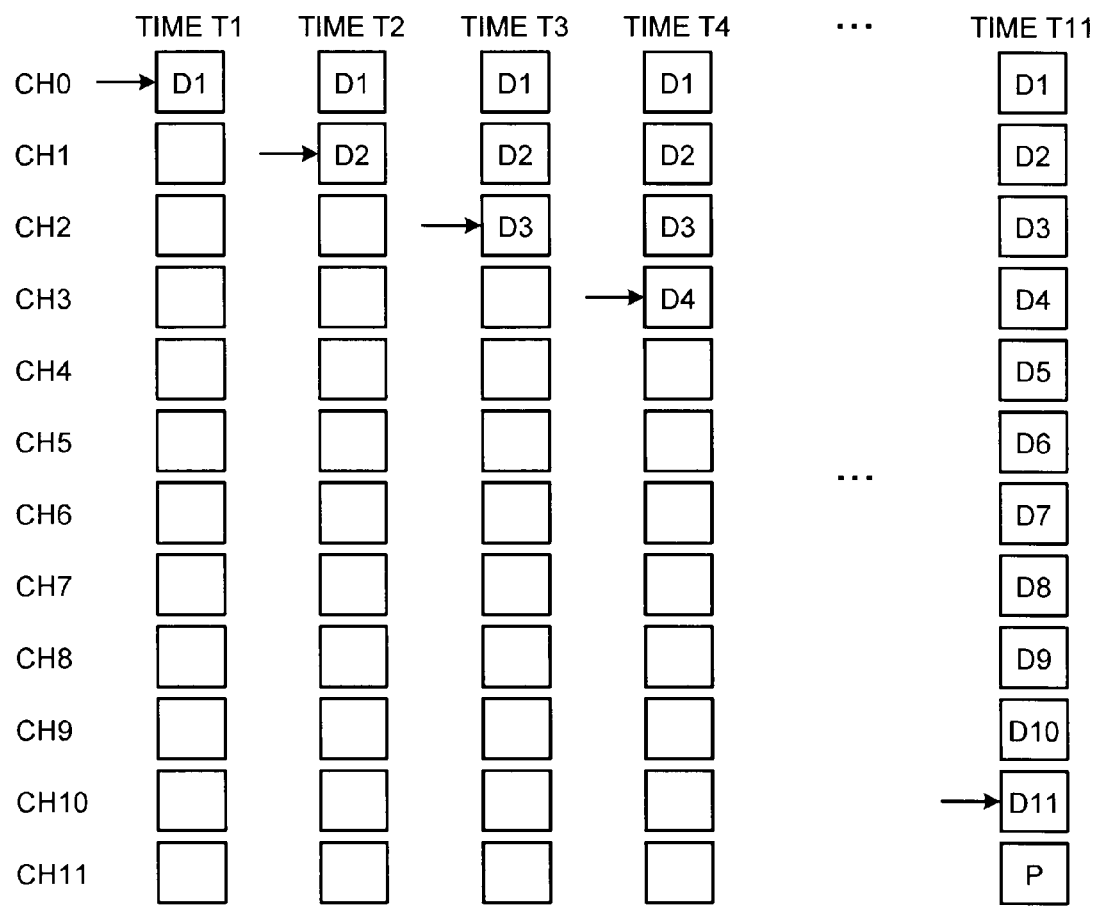
FIG. 6 is a diagram for explaining writing in a round-robin fashion.

Next, the manner in which a plurality of write target data pieces is written to the channels CH0 to CH11 in a round-robin fashion will be described. FIG. 6 is a diagram for explaining writing performed in a round-robin fashion. For simplification of the drawing, the logical block addresses added to data are not illustrated. As illustrated in FIG. 6, data are written sequentially from the channel CH0 to the channel CH10 in a round-robin fashion in such a manner that a first data piece D1 is written to the channel CH0 at time T1, a next data piece D2 is written to the channel CH1 at time T2, and so on.

When a data piece D11 is written to the channel CH10 at time T11, a parity P of the data piece D1 written to the channel CH0 at time T1, the data piece D2 written to the channel CH1 at time T2, a data piece D3 written to the channel CH2 at time T3, a data piece D4 written to the channel CH3 at time T4, a data piece D5 written to the channel CH4 at time T5, a data piece D6 written to the channel CH5 at time T6, a data piece D7 written to the channel CH6 at time T7, a data piece D8 written to the channel CH7 at time T8, a data piece D9 written to the channel CH8 at time T9, a data piece D10 written to the channel CH9 at time T10, and the data piece D11 written to the channel CH10 at time T11 is calculated as the redundant information, and the redundant information P is written to the channel CH11. Further data are written sequentially from the channel CH0 in a round-robin fashion. As a result of writing data in a round-robin fashion in this manner, the writing is performed uniformly among the channels. Although the manner in which data are written sequentially to the channels with time is illustrated in the example of FIG. 6, the manner in which data are written is not limited thereto. Alternatively, data may be written at the same time to two or more channels.

Figure 7:
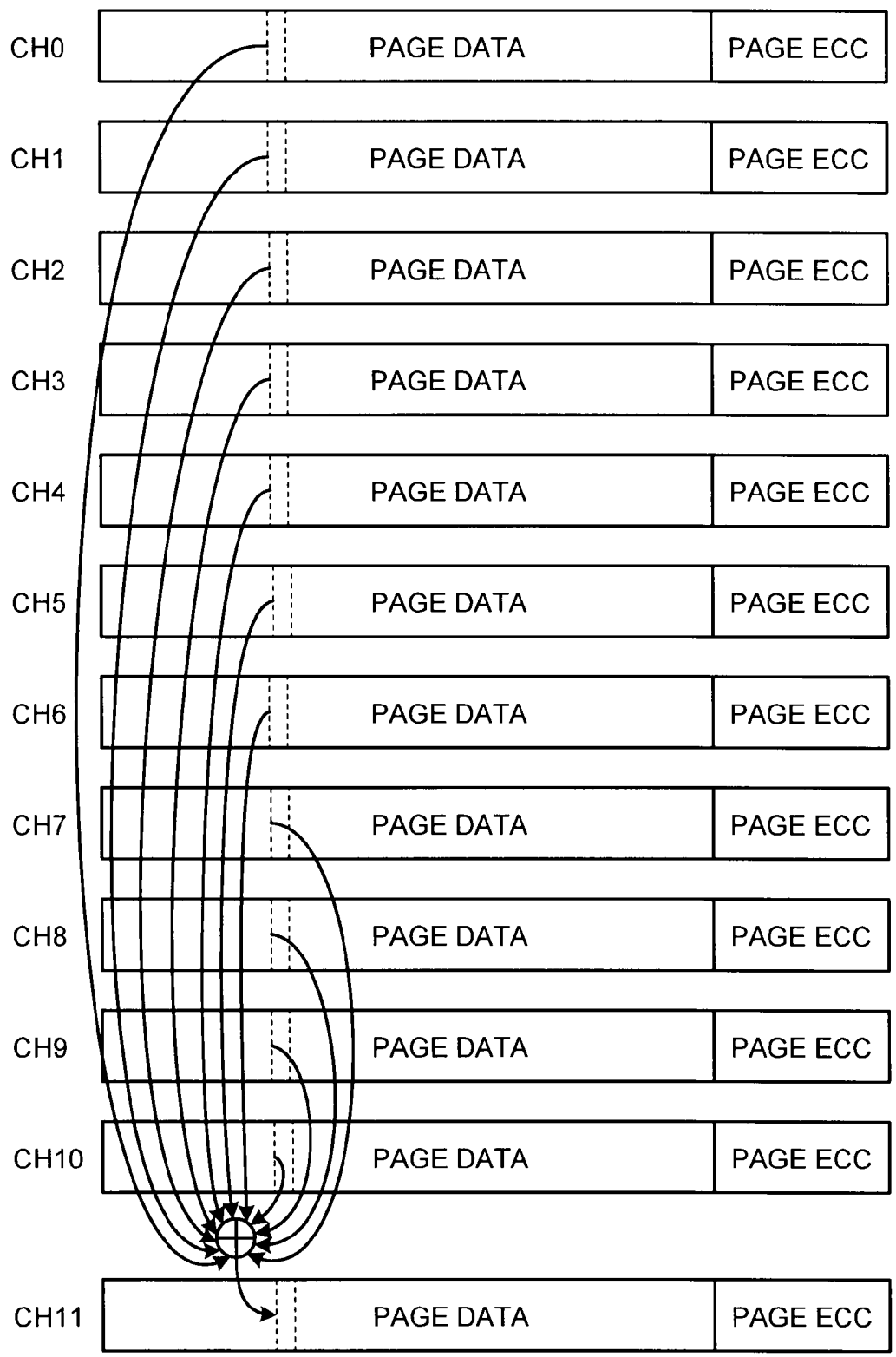
FIG. 7 is a diagram for explaining an error correcting code structure.

Next, a structure of the error correcting code will be described referring to FIG. 7. For convenience of description, the logical block addresses added to divided data pieces each written to each of the channels CH0 to CH10 are not illustrated in FIG. 7. As illustrated in FIG. 7, the writing unit 14 calculates an exclusive OR among bytes at positions with an equal offset for the write target data to be written to the channels CH0 to CH10, and writes the calculated value as the redundant information to the aforementioned position with an equal offset in the semiconductor memory 30L of the channel CH11. Thus, the error correcting code is generated from bytes at positions with an equal offset in the channels CH0 to CH11.

The description is continued referring back to FIG. 1. When a read command is received by the I/F unit 20 from the host device 50, the identifying unit 16 identifies a block in which data (referred to as "read target data") requested to be read are stored. The read command sent from the host device 50 contains a logical block address given to the read target data. The identifying unit 16 reads an index number and a channel number associated with the logical block address from the second table 64 and identifies the block in which the read target data are stored based on the read index number and channel number and the first table 62. Details of the identification will be described later. The reading unit 18 reads data stored in the block identified by the identifying unit 16.

Next, procedures of processes performed by the control unit 10 will be described. First, procedures of a process (referred to as a "write process") of writing write target data in response to a write command from the host device 50 performed by the control unit 10 will be described. Note that the generating unit 12 generates a free logical block in advance in the manner described above. The writing unit 14 sets, for each channel, a writing pointer pointing a page, to which data are to be written, of each of a plurality of blocks constituting the free logical block generated by the generating unit 12. Before starting writing, the writing unit 14 sets the writing pointer for each channel to point a first page in each of the blocks constituting the logical block generated by the generating unit 12. When the writing pointer reaches the end of block in all the channels and data cannot be recorded in the logical block any more, the generating unit 12 generates a new free logical block.

Figure 8:
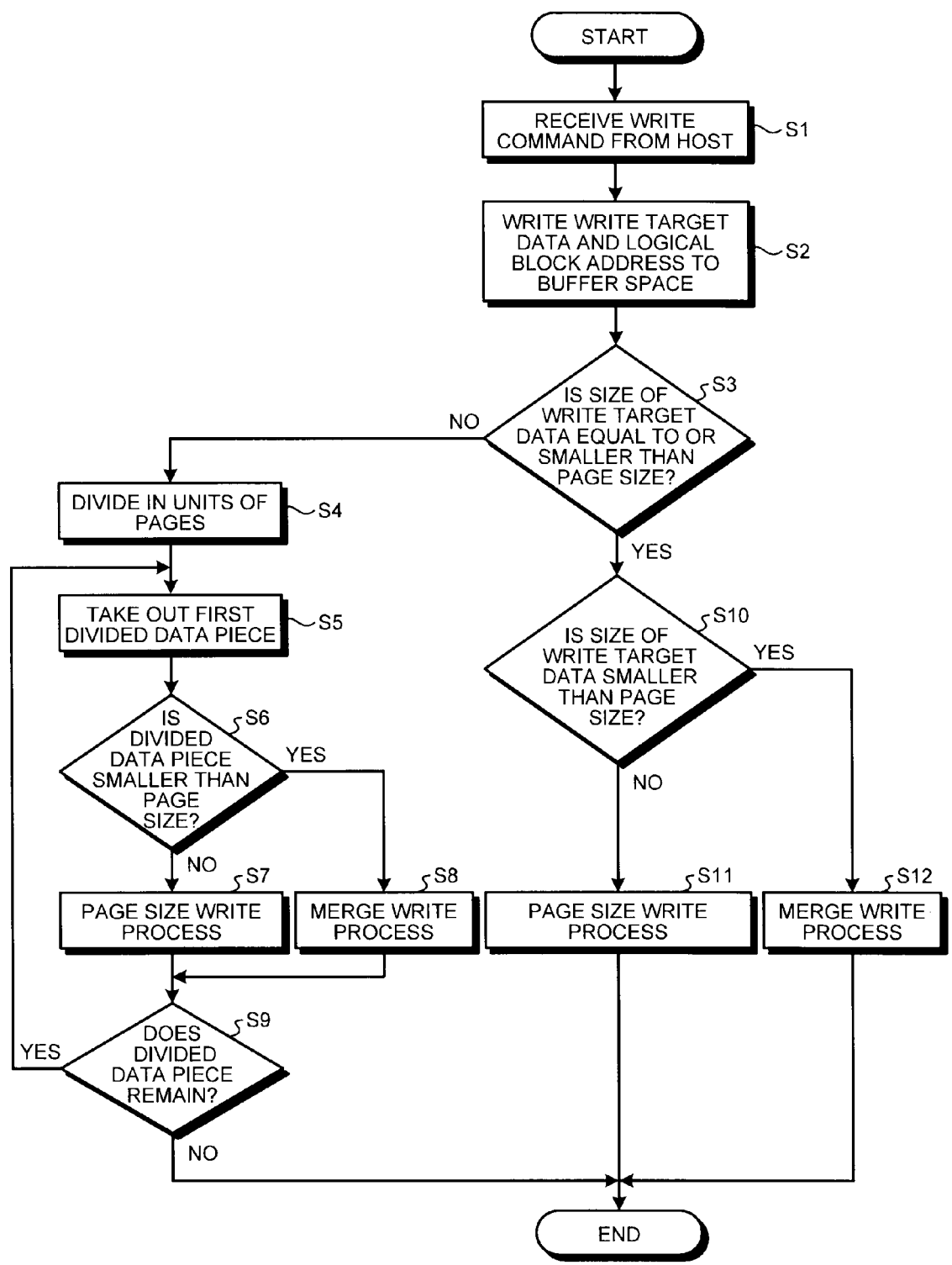
FIG. 8 is a flowchart illustrating an example of a write process.

FIG. 8 is a flowchart illustrating an example of the write process. As illustrated in FIG. 8, when a read command is received by the I/F unit 20 from the host device 50 (step S1), the writing unit 14 extracts data requested to be written (write target data) and a logical block address given to the write target data from the write command and writes the write target data and the logical block address in a buffer space in the storage unit 40 (step S2).

Next, the writing unit 14 determines whether or not the size of the write target data is equal to or smaller than a page size (4 KB as an example herein) (step S3). If the writing unit 14 determines that the size of the write target data is larger than the page size (No in step S3), the writing unit 14 divides the write target data in units of pages (step S4) and takes out the first divided data piece out of the divided data pieces from the buffer space (step S5). Next, the writing unit 14 determines whether or not the size of the divided data piece taken out in step S5 is smaller than a page size (step S6). If the writing unit 14 determines that the size of the divided data piece is not smaller than the page size, that is, the size of the divided data piece is equal to the page size (No in step S6), the writing unit 14 performs a process (page size write process) of writing data of the page size to a block (step S7). Details of the page size write process will be described later. If the writing unit 14 determines that the divided data piece is smaller than the page size in step S6 described above (Yes in step S6), the writing unit 14 performs a process (merge write process) of writing the data piece smaller than the page size to a block (step S8). Details of the merge write process will be described later.

After step S7 or step S8, the writing unit 14 determines whether or not a divided data piece remains in the buffer space (step S9). If the writing unit 14 determines that no divided data piece remains (No in step S9), the write process is terminated. If the writing unit 14 determines that a divided data piece remains (Yes in step S9), the process returns to step S5 described above.

On the other hand, if the writing unit 14 determines that the size of the write target data is equal to or smaller than the page size in step S3 described above (Yes in step S3), the writing unit 14 determines whether or not the size of the write target data is smaller than the page size (step S10). If the writing 14 determines that the size of the write target data is not smaller than the page size, that is, the size of the write target data is equal to the page size (No in step S10), the writing unit 14 performs the page size write process described later (step S11). On the other hand, if the writing unit 14 determines that the size of the write target data is smaller than the page size (Yes in step S10), the writing unit 14 performs the merge write process described later (step S12).

Figure 9:
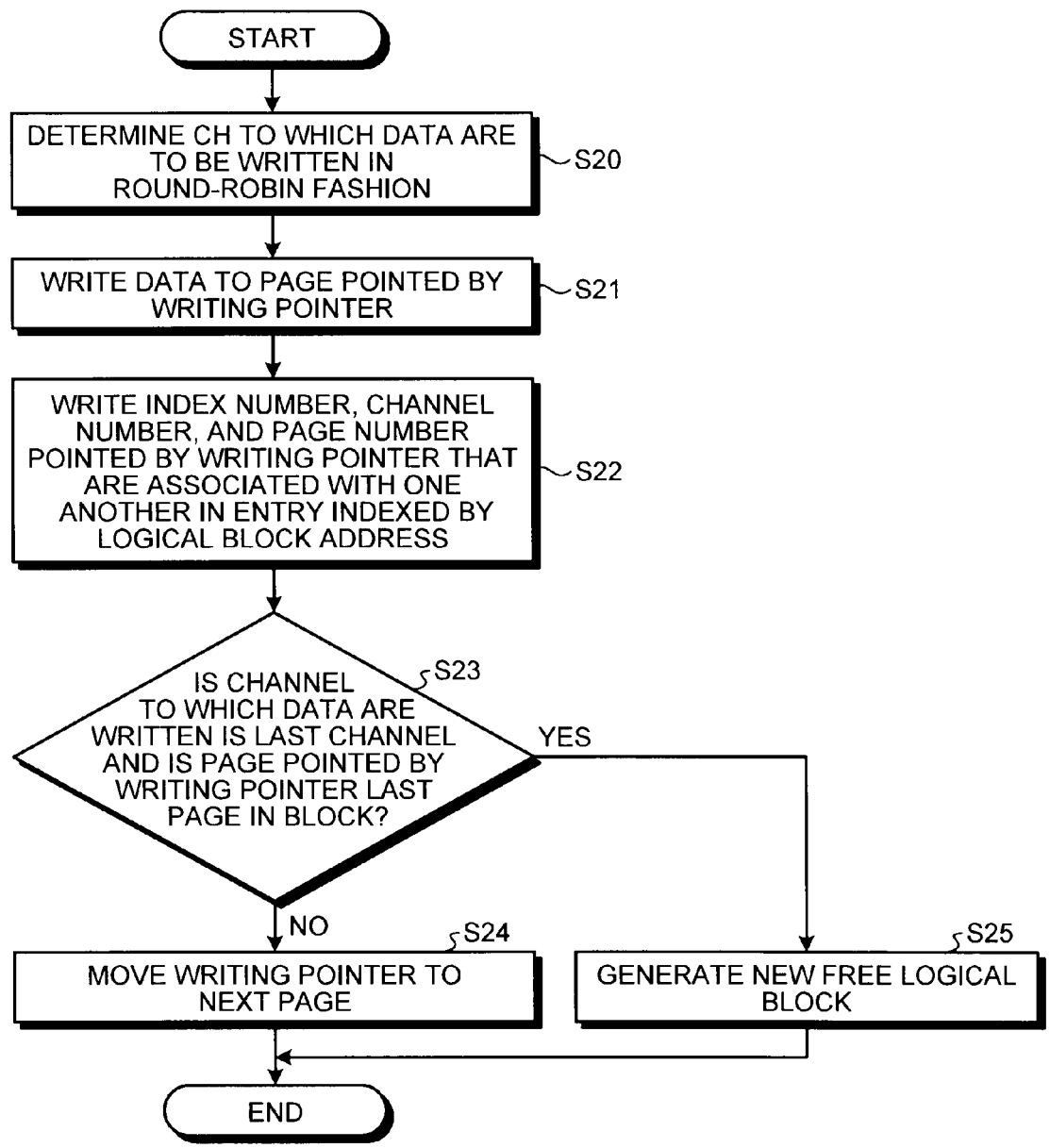
FIG. 9 is a flowchart illustrating an example of a page size write process.

Next, procedures of the page size write process performed by the writing unit 14 (control unit 10) will be described. FIG. 9 is a flowchart illustrating an example of the page size write process. First, the writing unit 14 determines a channel to which data (including divided data pieces) are to be written in a round-robin fashion (step S20). Next, the writing unit 14 writes the data to a page pointed by a writing pointer in a block associated with the channel determined in step S20 out of a plurality of blocks constituting a free logical block used for the current writing (step S21). Next, the writing unit 14 writes an index number (logical block number) associated with the free logical block used for the current writing, a channel number determined in step S20, and a page number pointed by the writing pointer in association with one another into an entry of the second table 64 indexed by the logical block address given to the data (step S22).

Next, the writing unit 14 determines whether or not the channel to which the data are written is the last channel (channel CH11 herein) and the page pointed by the writing pointer is the last page in the block (step S23). If the writing unit 14 determines that the condition that the channel to which the data are written is the last channel and the page pointed by the writing pointer is the last page in the block is not satisfied (result of step S23: No), the writing unit 14 increments the value of the writing pointer by 1 so that the writing pointer points the next page (step S24). On the other hand, if the writing unit 14 determines that the channel to which the data are written is the last channel and the page pointed by the writing pointer is the last page in the block (result of step S23: Yes), the generating unit 12 generates a new free logical block (step S25). Then, the writing unit 14 sets the writing pointer for each channel to point a first page in each of the blocks constituting the newly generated free logical block. The page size write process is terminated here.

Figure 10:
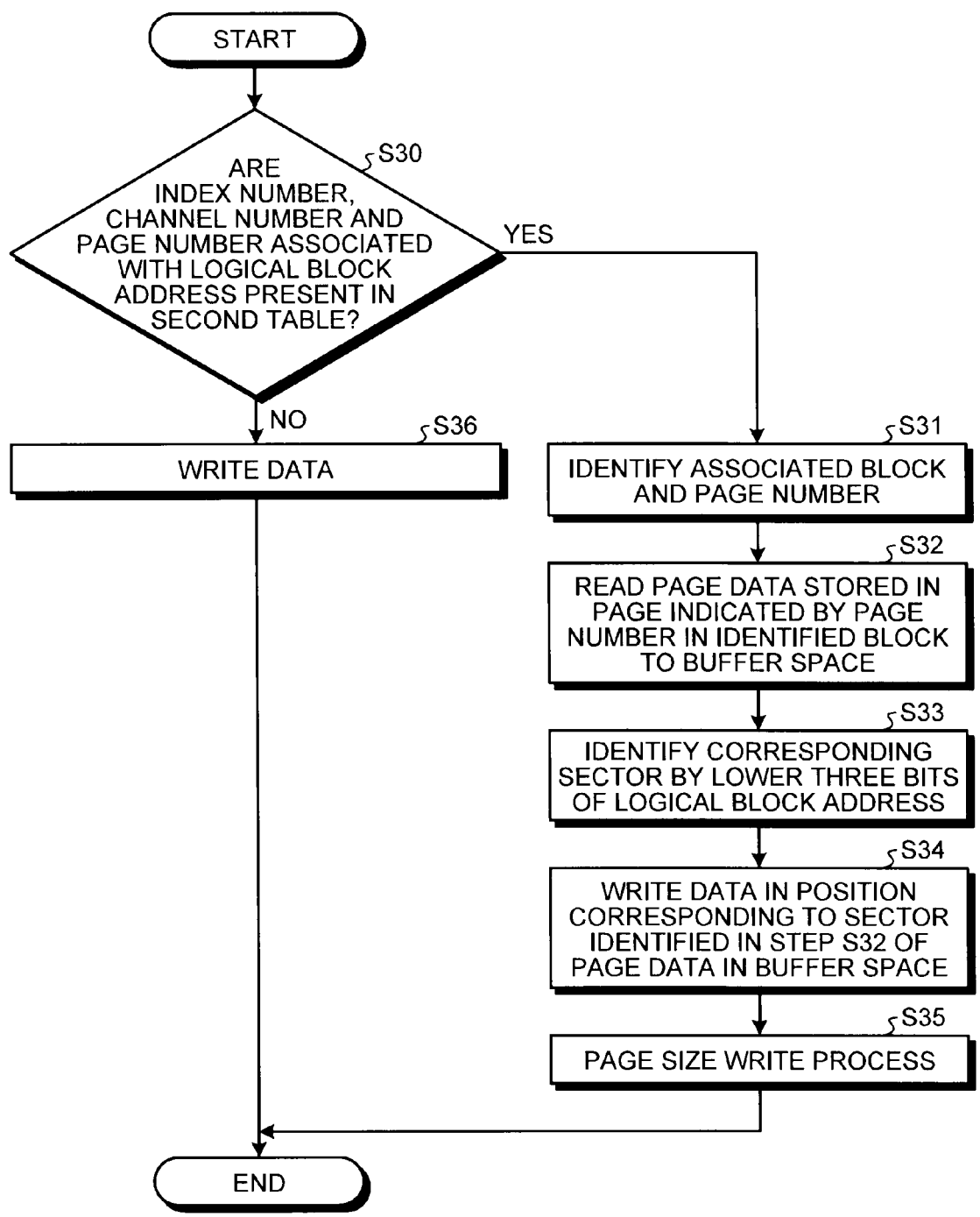
FIG. 10 is a flowchart illustrating an example of a merge write process.

Next, procedures of the merge write process performed by the control unit 10 will be described. FIG. 10 is a flowchart illustrating an example of the merge write process. First, the writing unit 14 determines whether or not an index number, a channel number and a page number associated with a logical block address (referred to as a "write logical block address") given to data to be written are already stored in the second table 64 (step S30).

If the writing unit 14 determines that the index number, the channel number and the page number associated with the write logical block address are already stored in the second table 64 (Yes in step S30), the control unit 10 (the identifying unit 16) reads the index number, the channel number and the page number associated with the write logical block address from the second table 64. The identifying unit 16 then identifies a block in the semiconductor memories 30 based on the read index number and channel number and the first table 62. The method for the identification will be described in detail in the read process described later. The identifying unit 16 also reads the page number associated with the write logical block address from the second table 64. In this manner, the block associated with the write logical block address and the page number in the block are identified (step S31).

Next, the reading unit 18 reads data (page data) stored in a page indicated by the page number in the block identified in step S31 to the buffer space in the storage unit 40 (step S32). Next, the identifying unit 16 refers to the lower three bits of the write logical block address to identify a corresponding sector (step S33). Next, the writing unit 14 writes data in a position corresponding to the sector identified in step S32 of the page data in the buffer space (step S34). The writing unit 14 then writes the page data in the buffer space to a new page (page pointed by the writing pointer). That is, the writing unit 14 performs the page size write process described above (step S35). The merge write process is terminated here.

On the other hand, if the writing unit 14 determines that the index number, the channel number and the page number associated with the write logical block address are not stored in the second table 64 in step S30 described above (No in step S30), the writing unit 14 writes the data in the same manner as in the page size write process described above (step S36). Since the details of the process is similar to that illustrated in FIG. 9, detailed description thereof is not repeated. The merge write process is terminated here.

Figure 11:
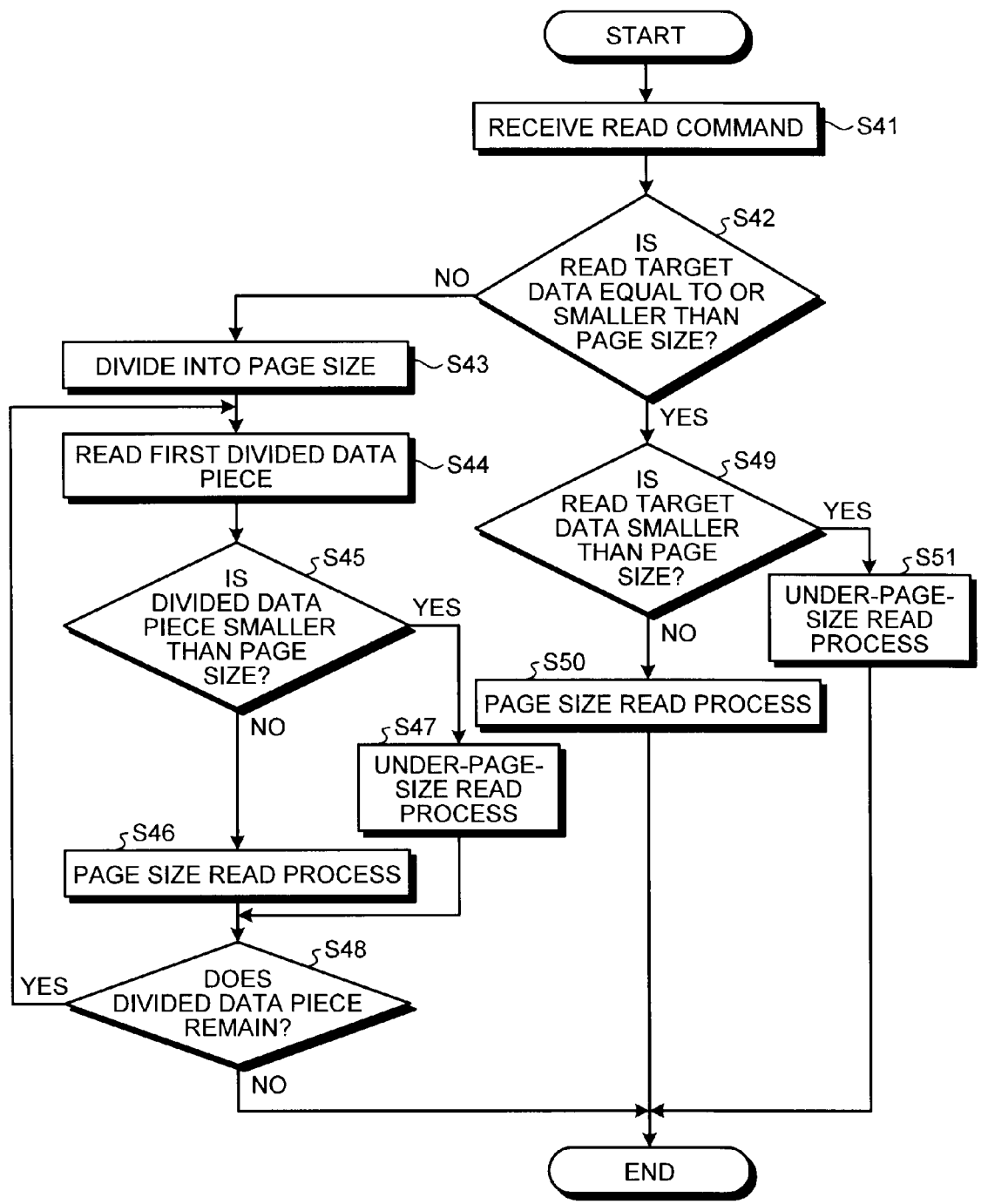
FIG. 11 is a flowchart illustrating an example of a read process.

Next, procedures of a process (referred to as a "read process") of reading data (read target data) requested to be read in response to a read command from the host device 50 performed by the control unit 10 will be described. FIG. 11 is a flowchart illustrating an example of the read process. As illustrated in FIG. 11, when a read command is received by the I/F unit 20 from the host device 50 (step S41), the control unit 10 (identifying unit 16) determines whether or not the size of the read target data is equal to or smaller than the size of a page (step S42). If the control unit 10 determines that the size of the read target data is larger than the size of a page (page size) (No in step S42), the control unit 10 divides the read target data into page size (step S43) and reads the first divided data piece out of the divided data pieces (step S44). Next, the control unit 10 determines whether or not the divided data piece read in step S44 is smaller than the size of a page (step S45). If the control unit 10 determines that the size of the divided data piece is not smaller than a page, that is, the size is equal to the size of a page (No in step S45), the control unit 10 performs a process (page size read process) of reading data of the page size. Details of the page size read process will be described later. If the control unit 10 determines that the size of the divided data piece is smaller than the page size in step S45 described above (Yes in step S45), the control unit 10 performs a process (under-page-size read process) of reading data smaller than the page size (step S47). Details of the under-page-size read process will be described later.

After step S46 or step S47, the control unit 10 determines whether or not a divided data piece remains (step S48). If the control unit 10 determines that no divided data piece remains (No in step S48), the read process is terminated. If the control unit 10 determines that a divided data piece remains (Yes in step S48), the process returns to step S44 described above.

On the other hand, if the control unit 10 determines that the size of the read target data is equal to or smaller than the page size in step S42 described above (Yes in step S42), the control unit 10 determines whether or not the size of the read target data is smaller than the page size (step S49). If the control unit 10 determines that the size of the read target data is not smaller than the page size, that is, the size is equal to the size of a page (No in step S49), the control unit 10 performs the page size read process described later (step S50). On the other hand, if the control unit 10 determines that the size of the read target data is smaller than the page size (Yes in step S49), the control unit 10 performs the under-page-size read process described later (step S51).

Next, procedures of the page size read process performed by the control unit 10 will be described. FIG. 12 is a flowchart illustrating an example of the page size read process. First, the control unit 10 (identifying unit 16) identifies a logical block address (referred to as a "read logical block address") given to the read target data (including divided data pieces) (step S61). Next, the identifying unit 16 reads each of an index number, a channel number and a page number associated with the read logical block address from the second table 64 (step S62).

Next, the identifying unit 16 identifies a block in which the read target data are stored based on the index number and the channel number read in step S62 and the first table 62 (step S63). More specifically, the identifying unit 16 identifies the block in which the read target data are stored based on the index number and the channel number read in step S62 and defect information in a column corresponding to the channel number in the first table 62.

Still more specifically, the block is identified as follows. A case in which the index number and the channel number read in step S62 are "5" and "CH1", respectively, is assumed here. In the example of FIG. 3, if no defect is present in the blocks, that is, if all of the defect information stored in the memory areas M are "0", a logical block associated with the index number 5 is constituted by blocks in the fifth row of the channels CH0 to CH11. Since the read channel number is "CH1" (corresponding to the second column in the first table 62), a block associated with the memory area M52 located in the second column in the fifth row in the first table 62 when no defect is present in the blocks.

In fact, however, the memory area M12 belonging to the first row and the memory area M22 belonging to the second row in the second column of the first table 62 have the defect information "1" stored therein as illustrated in FIG. 3. Thus, since defective blocks are present, the identifying unit 16 identifies a fifth nondefective block counted from the top in the second column in the first table 62, the "fifth" corresponding to the read index number "5", as the block in which the read target data are stored. Here, the identifying unit 16 identifies the block associated with the fifth memory area M (memory area M72 in the seventh row) counted from the memory area M32 belonging to the third row in the second column in the first table 62 as the block in which the read target data are stored. As described above, the identifying unit 16 identifies the block in which the read target data are stored based on the index number and the channel number read in step S62 and the defect information in the column corresponding to the channel number in the first table 62.

Next, the reading unit 18 reads data stored in a page indicated by the page number read from the second table 64 in step S62 among pages in the block identified in step S63 to the buffer space in the storage unit 40 (step S64). Next, the control unit 10 controls the I/F unit 20 to transfer the data read to the buffer space to the host device 50 (step S65). The page size read process is terminated here.

Next, procedures of the under-page-size read process performed by the control unit 10 will be described. FIG. 13 is a flowchart illustrating an example of the under-page-size read process. First, the control unit 10 (identifying unit 16) identifies a read logical block address given to read target data (step S71). Next, the identifying unit 16 reads each of an index number, a channel number and a page number associated with the read logical block address from the second table 64 (step S72). Next, the identifying unit 16 identifies a block in which the read target data are stored based on the index number and the channel number read in step S72 and the first table 62 (step S73). Since the details of the process is similar to those of step S63 in FIG. 12, detailed description thereof is not repeated.

Next, the reading unit 18 reads data stored in a page indicated by the page number read from the second table 64 in step S72 among pages in the block identified in step S73 to the buffer space in the storage unit 40 (step S74). Next, the control unit 10 controls the I/F unit 20 to transfer, to the host device 50, a data piece corresponding to a sector identified by the lower three bits of the read logical block address among data read to the buffer space (step S75). The under-page-size read process is terminated here.

As described above, it is sufficient in the embodiment to store only one bit information in each memory area M in the first table 62. Consequently, an advantageous effect that the size of the logical-to-physical translation table 60 can be reduced can be achieved.

If it is assumed here that location information (physical block address) of a block associated with each memory area M in the first table 62 is stored in the memory area M, the number of bits required to express 16,000 blocks per one channel is 14 bits. In this case, the capacity of the first table 62 is thus 14×12 (number of channels)×16,000 (number of rows) ÷8=336 Kbytes. In the embodiment, in contrast, the number of bits required to express presence and absence of defective blocks in each row in the first table 62 is 12 bits. Accordingly, the capacity of the first table 62 is 12×16,000 (number of rows)÷8=24 Kbytes. Therefore, the size of the logical-to-physical translation table 60 can be significantly reduced according to the embodiment.

While a certain embodiment has been described, the embodiment has been presented by way of example only, and is not intended to limit the scope of the inventions. Indeed, the novel systems and programs described herein may be embodied in a variety of other forms; furthermore, various omission, substitutions and changes in the form of the systems and programs described herein may be made without departing from the spirit of the inventions. The accompanying claims and their equivalents are intended to cover such forms or modifications as would fall within the scope and spirits of the inventions.

For example, in the embodiment described above, the generating unit 12 selects a block in each channel by using memory areas M in which defect information "0" is stored in the first table 62 for generating a logical block. Alternatively, the generating unit 12 may select a block in each channel by using memory areas M in which defect information "1" is stored in the first table 62. For example, if a case in which the generating unit 12 selects the index number "5" for generating a logical block is assumed as an example, the block in each channel is selected as follows.

Focusing on the second column in the first table 62 in the example of FIG. 3, the generating unit 12 counts the number of memory areas M in which the defect information "1" is stored among the memory areas M (M12, M22, M32, M42 and M52) belonging to the first row to the row corresponding to the selected index number "5" (fifth row). If no memory area M in which the defect information "1" is stored is present, the generating unit 12 selects a block associated with the memory area M52 belonging to the fifth row. Since the memory areas M (M12 and M22) belonging to the first row and the second row, respectively, have the defect information "1" stored therein as illustrated in FIG. 3, the count value in this case is "2".

The generating unit 12 then counts the number of memory areas M in which the defect information "1" is stored among the memory areas M (M52, M62 and M72) belonging to the fifth row corresponding to the selected index number "5" to the seventh row lower than the fifth row by the count value "2". If no memory area M in which the defect information "1"

is stored is present, the generating unit 12 selects a block associated with the memory area M72 belonging to the seventh row. On the other hand, if a memory area M or some memory areas M in which the defect information "1" is stored are present, the generating unit 12 counts the number of memory areas M in which the defect information "1" is stored among the memory areas M belonging to the seventh row to the row lower than the seventh row by the current count value. In the example of FIG. 3, since no memory area M in which the defect information "1" is stored is present in the fifth row to the seventh row, the generating unit 12 selects a block associated with the memory area M72 belonging to the seventh row. Blocks in other columns are selected in the same manner.

In other words, the generating unit 12 only needs to generate a set of blocks (logical block) based on the selected index number and the defect information in the first table 62, and may select the blocks by using count values of the memory areas M in which the defect information "1" is stored or may select the blocks by using count values of the memory areas M in which the defect information "0" is stored. Moreover, a count value may be a value obtained by counting from the top or a value obtained by counting from the bottom, and the type thereof may be arbitrarily modified.

The same is applicable to the read process, in which the identifying unit 16 only needs to identify a block in which data requested to be read are stored based on an index number and a channel number read from the second table 64 and defect information in a column corresponding to the channel number in the first table 62.

In the embodiment described above, the number of semiconductor memories 30 (the number of channels) is twelve. However, the number of the semiconductor memories 30 is not limited thereto and may be arbitrarily modified. The sizes of a page, a block and the semiconductor memory 30 can also be arbitrarily modified.

The memory system 100 described above may include an update unit configured to update the first table 62 each time a new defect is generated in a block. This prevents data from being written in a defective block during the write process. In addition, if a secondary defect is generated in a block in which data are written, for example, the data can be recovered by performing error correction using a logical block.

In the embodiment described above, the logical-to-physical translation table 60 is stored in the storage unit 40. Alternatively, however, the logical-to-physical translation table 60 may be stored anywhere in the memory system 100. For example, at least part of the logical-to-physical translation table 60 may be stored in a semiconductor memory 30. For example, the whole logical-to-physical translation table 60 may be stored in a semiconductor memory 30, or part of the logical-to-physical translation table 60 may be stored in a semiconductor memory 30 and the rest of the logical-to-physical translation table 60 may be stored in the storage unit 40. The storage unit 40 may be of any type. For example, the storage unit 40 may be a static random access memory (SRAM) or a dynamic random access memory (DRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a plurality of semiconductor memories each having a plurality of blocks;
   a first table in which a plurality of memory areas that is associated one-to-one with the blocks in the semiconductor memories is arranged in a matrix, the memory areas associated with the respective blocks in any one of the semiconductor memories are arranged in each column, and defect information indicating presence or absence of a defect in a block associated with each memory area is stored in the memory area;
   a receiving unit configured to receive a write command requesting writing of data to a semiconductor memory;
   a generating unit configured to select one of a plurality of index numbers associated one-to-one with a plurality of rows in the first table, and select one block to which data are to be written in each of the semiconductor memories based on the selected index number and the first table to generate a set of the blocks;
   a second table in which the index number and one of a plurality of channel numbers associated one-to-one with the semiconductor memories are stored in association with each of logical block addresses individually given to a plurality of pieces of the data; and
   a writing unit configured, when the write command is received by the receiving unit, to select one of the channel numbers, write the data requested to be written to a block associated with the selected channel number among the blocks constituting the set, and write the logical block address given to the data, the index number associated with the set and the selected channel number in association with one another into the second table, wherein
   when the blocks in each of the semiconductor memories have no defect, the generating unit selects one block associated with the memory area belonging to a row indicated by the index number from each of the semiconductor memories.

2. The system according to claim 1, further comprising:
   an identifying unit configured, when a read command requesting to read data is received by the receiving unit, to read an index number and a channel number associated with a logical block address given to the data requested to be read from the second table, and identify a block in which the data requested to be read are stored based on the read index number and channel number and the first table; and
   a reading unit configured to read the data stored in the block identified by the identifying unit.

3. The system according to claim 1, wherein
   the generating unit generates the set based on the selected index number and the defect information in the first table.

4. The system according to claim 3, wherein
   the generating unit generates the set by selecting a block in a row lower than the top row by the number of rows corresponding to the selected index number among non-defective blocks in a column for each column in the first table.

5. The system according to claim 2, wherein
   the identifying unit identifies the block in which the data requested to be read are stored based on the index number and the channel number read from the second table and the defect information in the column corresponding to the channel number in the first table.

6. The system according to claim 5, wherein
the identifying unit identifies a block in a row lower than the top row by the number of rows corresponding to the selected index number among nondefective blocks in the column corresponding to the channel number in the first table as the block in which the data requested to be read are stored.

7. The system according to claim 1, wherein
the defect information is one-bit information.

8. A computer program product comprising a computer-readable medium including programmed instructions, wherein the instructions, when executed by a computer, causes the computer to execute:
receiving a write command requesting writing of data to a semiconductor memory;
selecting one of a plurality of index numbers associated one-to-one with a plurality of rows in a first table in which a plurality of memory areas that is associated one-to-one with blocks in semiconductor memories is arranged in a matrix, the memory areas associated with the respective blocks in any one of the semiconductor memories are arranged in each column, and defect information indicating presence or absence of a defect in a block associated with each memory area is stored in the memory area;
generating a set of the blocks by selecting one block to which data are to be written in each of the semiconductor memories based on the index number selected in the selecting the index number and the first table;
selecting one of channel numbers associated one-to-one with the semiconductor memories when the write command is received; and
writing the data requested to be written to a block associated with the channel number selected in the selecting the channel number among the blocks constituting the set, and writing a logical block address given to the data, the index number associated with the set and the channel number in association with one another into a second table.

9. The computer program product according to claim 8, wherein the instructions cause the computer to further perform:
when a read command requesting to read data is received by the receiving, identifying a block in which the data requested to be read are stored based on an index number and a channel number by reading the index number and the channel number corresponding to a logical block address given to the data requested to be read from the second table and based on the first table; and
reading the data stored in the block identified by the identifying.

10. The computer program product according to claim 8, wherein the instructions cause the computer to further perform:
in the generating, generating the set based on the selected index number and the defect information in the first table.

11. The computer program product according to claim 10, wherein the instructions cause the computer to further perform:
in the generating, generating the set by selecting a block in a row lower than the top row by the number of rows corresponding to the selected index number among nondefective blocks in a column for each column in the first table.

12. The computer program product according to claim 9, wherein the instructions cause the computer to further perform:
in the identifying, identifying the block in which the data requested to be read are stored based on the index number and the channel number read from the second table and the defect information in the column corresponding to the channel number in the first table.

13. The computer program product according to claim 12, wherein the instructions cause the computer to further perform:
in the identifying, identifying a block in a row lower than the top row by the number of rows corresponding to the selected index number among nondefective blocks in the column corresponding to the channel number in the first table as the block in which the data requested to be read are stored.

14. The computer program product according to claim 8, wherein the defect information is one-bit information.

15. A method for controlling a memory system, the method comprising:
receiving a write command requesting writing of data to a semiconductor memory;
selecting one of a plurality of index numbers associated one-to-one with a plurality of rows in a first table in which a plurality of memory areas that is associated one-to-one with blocks in semiconductor memories is arranged in a matrix, the memory areas associated with the respective blocks in any one of the semiconductor memories are arranged in each column, and defect information indicating presence or absence of a defect in a block associated with each memory area is stored in the memory area;
generating a set of the blocks by selecting one block to which data are to be written in each of the semiconductor memories based on the index number selected in the selecting the index number and the first table;
selecting one of channel numbers associated one-to-one with the semiconductor memories in response to the write command; and
writing the data requested to be written to a block associated with the channel number selected in the selecting the channel number among the blocks constituting the set, and writing a logical block address given to the data, the index number associated with the set and the channel number in association with one another into a second table.

16. The method according to claim 15, further comprising:
in response to a read command requesting to read data, identifying a block in which the data requested to be read are stored based on an index number and a channel number by reading the index number and the channel number corresponding to a logical block address given to the data requested to be read from the second table and based on the first table; and
reading the data stored in the block identified by the identifying.

17. The method according to claim 15, wherein the generating comprises:
generating the set based on the selected index number and the defect information in the first table.

18. The method according to claim 17, wherein the generating comprises:
generating the set by selecting a block in a row lower than the top row by the number of rows corresponding to the selected index number among nondefective blocks in a column for each column in the first table.

19. The method according to claim 16, wherein the identifying comprises:
   identifying the block in which the data requested to be read are stored based on the index number and the channel number read from the second table and the defect information in the column corresponding to the channel number in the first table.

20. The method according to claim 19, wherein the identifying comprises:
   identifying a block in a row lower than the top row by the number of rows corresponding to the selected index number among nondefective blocks in the column corresponding to the channel number in the first table as the block in which the data requested to be read are stored.

* * * * *